US012780444B2

(12) United States Patent
Swain et al.

(10) Patent No.: US 12,780,444 B2
(45) Date of Patent: Nov. 3, 2026

(54) SYSTEMS AND METHODS FOR MONITORING SEATING IN AN AIRCRAFT

(71) Applicant: B/E Aerospace, Inc., Winston-Salem, NC (US)

(72) Inventors: Soumya Ranjan Swain, Cuttack (IN); Kumar Neeraj, Bengaluru (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 56 days.

(21) Appl. No.: 18/915,812

(22) Filed: Oct. 15, 2024

(65) Prior Publication Data

US 2025/0187750 A1 Jun. 12, 2025

(30) Foreign Application Priority Data

Dec. 12, 2023 (IN) ............................ 202341084675

(51) Int. Cl.

*G08B 21/00* (2006.01)
*B64D 45/00* (2006.01)
*B64D 11/06* (2006.01)
*B64D 47/08* (2006.01)

(52) U.S. Cl.

CPC ...... *B64D 45/0005* (2013.01); *B64D 11/0641* (2014.12); *B64D 11/0643* (2014.12); *B64D 47/08* (2013.01)

(58) Field of Classification Search

CPC ............ B64D 45/0005; B64D 11/0641; B64D 11/0643; B64D 47/08; B64D 11/0015; B64D 11/064

See application file for complete search history.

(56) References Cited

U.S. PATENT DOCUMENTS 5,555,458 A * 9/1996 Large ................. B64D 11/0015 340/945
6,448,907 B1 9/2002 Naclerio
6,888,475 B2 * 5/2005 Darr ................... B64D 45/0044 340/438

(Continued)

FOREIGN PATENT DOCUMENTS

DE 102004025319 A1 12/2005
GB 2496452 A 5/2013

(Continued)

OTHER PUBLICATIONS

European Patent Office, Extended European Search Report received in EP Application No. 24218424.0, Feb. 20, 2025, 8 pages.

*Primary Examiner* — Toan N Pham

(74) *Attorney, Agent, or Firm* — Suiter Swantz IP

(57) ABSTRACT

Systems and methods for monitoring seating in an aircraft. In embodiments, a cabin controller is communicatively coupled to a plurality of local seat controllers each operable for controller the position of actuator driven movable seat components. In embodiments, the cabin controller communicates to the flight crew, for instance via a graphical user interface, status compliance of the seat components according to a phase of flight of the aircraft, and where a seat component position is determined to be non-compliant, is configured to move the seat component into compliance by communicating the particular local seat controller. The seats may include passenger seats and divans in a cabin configuration for a business or private jet.

15 Claims, 4 Drawing Sheets

(56) References Cited

U.S. PATENT DOCUMENTS

| | | | | | |
|---|---|---|---|---|---|
| 6,949,904 | B2 | | 9/2005 | Rumney | |
| 10,464,678 | B2 | | 11/2019 | Brunaux et al. | |
| 10,745,146 | B2 | * | 8/2020 | Perez | B64D 45/00 |
| 11,021,269 | B2 | * | 6/2021 | Fagan | B64D 11/00155 |
| 12,344,393 | B2 | * | 7/2025 | Goyal | G06V 20/59 |
| 2004/0195875 | A1 | * | 10/2004 | Skelly | B60N 2/242 297/217.3 |
| 2006/0163430 | A1 | * | 7/2006 | Cordina | B64D 11/00 244/118.5 |
| 2017/0106826 | A1 | | 4/2017 | Keiser et al. | |
| 2017/0283086 | A1 | | 10/2017 | Garing et al. | |
| 2022/0315225 | A1 | | 10/2022 | Fagan et al. | |

FOREIGN PATENT DOCUMENTS

| | | | | | |
|---|---|---|---|---|---|
| JP | H06255592 | A | * | 9/1994 | B64D 11/0624 |
| WO | 2009062614 | A2 | | 5/2009 | |
| WO | 2017176748 | A1 | | 10/2017 | |

* cited by examiner

118

| Phase of Flight | Seat Position |
|---|---|
| Pre-flight | Seat 1 – backrest position 2, leg rest position 2, Divan 1 – backrest position 2 |
| Taxi | Seat 1 – backrest position 1, leg rest position 1, Divan 1 – backrest position 1 |
| Take-off | Seat 1 – backrest position 1, leg rest position 1, Divan 1 – backrest position 1 |
| Climb | Seat 1 – backrest position 1, leg rest position 1, Divan 1 – backrest position 1 |
| Cruise | Seat 1 – backrest position 3, leg rest position 3, Divan 1 – backrest position 3 |
| Descent | Seat 1 – backrest position 2, leg rest position 2, Divan 1 – backrest position 2 |
| Landing | Seat 1 – backrest position 1, leg rest position 1, Divan 1 – backrest position 1 |
| Post-flight | Seat 1 – backrest position 2, leg rest position 2, Divan 1 – backrest position 2 |
| Custom 1 | Seat 1 – backrest position 3, leg rest position 4, Divan 1 – backrest position 2 |
| Custom 2 | Seat 1 – backrest position 2, leg rest position 2, Divan 1 – backrest position 2 |
| Custom 3 | Seat 1 – backrest position 4, leg rest position 5, Divan 1 – backrest position 1 |

FIG. 2

SYSTEMS AND METHODS FOR MONITORING SEATING IN AN AIRCRAFT

CROSS REFERENCE TO RELATED APPLICATION

This nonprovisional application claims the benefit of priority of Indian Patent Application No. 202341084675 filed Dec. 12, 2023, which is hereby incorporated by reference in its entirety.

TECHNICAL FIELD AND BACKGROUND

The present disclosure relates generally to solutions for accurately monitoring seating in real-time during phases of flight, and more particularly, to a centralized controller configured to monitor various seating throughout a passenger cabin, and make seat position adjustments as necessary based on at least one of occupancy and phase of flight.

Aircraft such as business and private jets can include various furniture for seating and sleeping. Such furniture can include, but is not limited to, individual passenger seats and divans, each of which may be configured to adjust between different positions during different phases of flight. For example, passenger seats may be configured to transition between upright for taxi, take-off, and landing (TTOL) and lie flat during flight, through various intermediate positions, while divans may be configured to convert from passenger seats during TTOL to a bed during flight, through various lounge positions.

Passenger seats in particular may be highly adjustable. In some cases, highly adjustable seats may include more than a dozen actuators operable for adjusting one or more of the seat pan, backrest, leg rest, armrests, headrest, lumbar, etc., through various singular and coordinated movements. In some cases, seats may also be adjustable laterally, longitudinally, and rotationally with respect to other seats, aisles and furniture.

Aircraft are subject to different governmental regulations during different phases of flight, and particularly during TTOL where seating furniture is required to be positioned upright, passengers are required to be seated, and safety restraints are required to be used. At present, compliance with these requirements is performed by one or more of visual inspection of the cabin by the flight crew, and dedicated sensors positioned in the cabin. Drawbacks of the former include delayed responses to seat position issues, human error, and limited visibility to some seating, while drawbacks of the latter include the need for separate sensors and networking which add weight, cost, and complexity to the aircraft. Both solutions further require action by the flight crew to inform the passenger regarding seat position issues such that corrective action can be taken.

To overcome the drawbacks of conventional monitoring solutions, what is needed is a seat monitoring solution that operates in real-time, during all phases of flight, without the need for external sensors, and without visual inspection by the flight crew.

BRIEF SUMMARY

In one aspect, embodiments of the inventive concepts disclosed herein are directed to a system for monitoring seating in an aircraft. The system includes a plurality of local seat controllers, wherein each local seat controller is associated with a seat and is communicatively coupled to at least one actuator mechanically coupled to at least one movable seat component. The system further includes a cabin controller communicatively coupled to the plurality of local seat controllers, and the cabin controller includes an interactive digital display, a memory, and a processor.

In embodiments, a table is stored in the memory of the cabin controller and includes information pertaining to compliant seat component positions corresponding to phases of flight. In embodiments, the processor includes processing circuitry configured to execute machine-readable instructions stored to a non-transitory computer readable medium, wherein the instructions, when executed by the processing circuitry, cause the processing circuitry to receive, from each of the plurality of local seat controllers, positional information from the at least one actuator determinative of positional information of the at least one movable seal component, and receive, from a flight phase selector, a current phase of flight. The processing circuitry is further configured to determine for each seat, from the received positional information from the at least one actuator and the received current phase of flight, movable seat position compliance or non-compliance, and cause the interactive digital display to display for each seat the determined movable seat component compliance or non-compliance. In embodiments, for each seat having a movable seat component determined to be non-compliant, the processing circuitry is further configured to instruct, through the interactive digital display, the respective local seat controller to operate the at least one actuator to move the at least one movable seat component to achieve a compliant seat component position.

In some embodiments, each seat includes at least one sensor configured to sense an occupancy state of the respective seat, the local seat controller is communicatively coupled to the at least one sensor and is configured to determine the occupancy state of the seat and report the determined occupancy state to the cabin controller, and the processing circuitry of the cabin controller is further configured to allow the local seat controller to operate the at least one actuator to move the at least one movable seat component to achieve a compliant seat component position when the occupancy state of the respective seat is determined to be unoccupied.

In some embodiments, the interactive digital display is configured to display a layout of the seats in the aircraft, display the at least one movable seat component for each seat, and differentiate graphically between compliant and non-compliant movable seat component positions.

In some embodiments, the phases of flight include at least two of pre-flight, taxi, take-off, climb, cruise, descent, approach, landing, taxi, and post-flight.

In some embodiments, the at least one movable seat component includes at least one of a backrest and a leg rest.

In some embodiments, each seat is an individual passenger seat or a divan.

In some embodiments, the processing circuitry of the cabin controller is further configured to issue an alert, broadcast by the interactive digital display, when the at least one movable seat component is determined to be non-compliant.

In some embodiments, the processing circuitry of the cabin controller is further configured to instruct all of the plurality of local seat controllers to operate their respective at least one actuator to move their respective at least one movable seat component to a predefined default position assigned to a predefined phase of the phases of flight.

In some embodiments, the predefined default position for each seat may be customizable.

In some embodiments, at least one of the seats is an individual passenger seat and at least one of the seats is a divan.

In another aspect, embodiments of the inventive concepts disclosed herein are directed to a system for monitoring seating in an aircraft passenger cabin including a plurality of local seat controllers each associated with a seat and communicatively coupled to at least one actuator mechanically coupled to at least one movable seat component. In embodiments, the system includes a cabin controller positioned in the aircraft remote from the plurality of local seat controllers, the cabin controller is communicatively coupled to the plurality of local seat controllers, and the cabin controller includes an interactive digital display, a memory, and a processor having processing circuitry configured to perform to determine compliance status of each movable seat component and instruct correction action as necessary to move the seat component(s) to a compliant position.

In a further aspect, embodiments of the inventive concepts disclosed herein are directed to a method for monitoring movable seat component positions in an aircraft passenger cabin including a plurality of local seat controllers each associated with a seat and communicatively coupled to at least one actuator mechanically coupled to at least one movable seat component. In embodiments, the method includes the steps of receiving from each of the plurality of local seat controllers positional information from the at least one actuator determinative of positional information of the at least one movable seat component, receiving from a flight phase selector a current phase of flight, determining for each seat from the received positional information from the at least one actuator and the received current phase of flight movable seat position compliance or non-compliance, and for each seat having a movable seat component determined to be non-compliant, instructing the respective local seat controller to operate the at least one actuator to move the at least one seat movable component to achieve a compliant seat component position.

In some embodiments, the method is performed by a cabin controller communicatively coupled to the plurality of local seat controllers, the cabin controller including an interactive digital display, a memory, and a processor, wherein a table is stored in the memory of the cabin controller and includes information pertaining to compliant seat component positions corresponding to phases of flight, and the processor includes processing circuitry configured to execute machine-readable instructions stored to a non-transitory computer readable medium.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 2 is a table illustrating phases of flight and corresponding compliant seat component position, in accordance with example embodiments of this disclosure;

DETAILED DESCRIPTION

Figure 1:
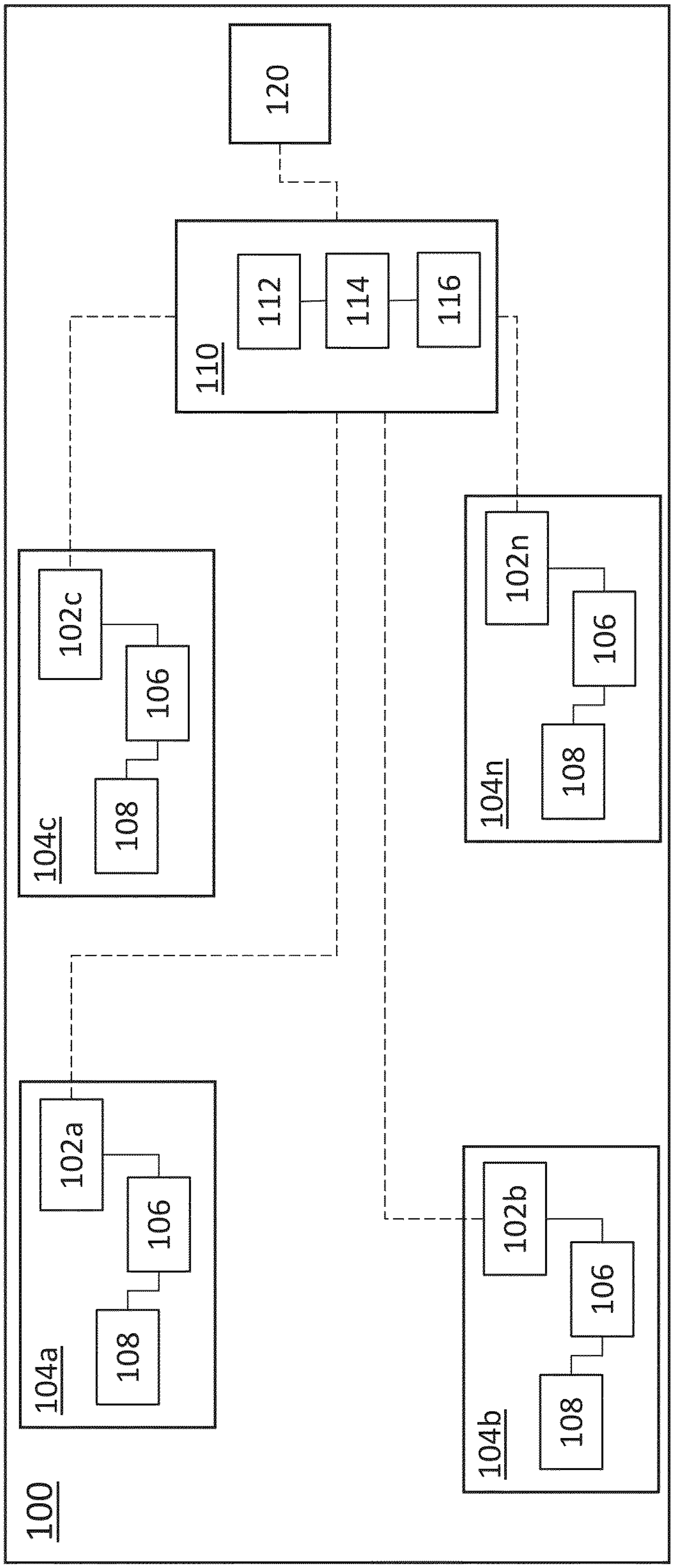
FIG. 1 is a block diagram illustrating a system for monitoring seating in an aircraft, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to systems and methods for monitoring seats in passenger cabin, for instance a passenger cabin in a business or private jet. In embodiments, the system includes a cabin controller communicatively coupled to a plurality of local seat controllers. The cabin controller may be positioned remote from the local seat controllers, for instance in a crew area along with other cabin control and monitoring systems. The cabin controller may include an interactive digital display in which the seat layout is displayed graphically along with seat component positions as they exist in real-time, and with other information associated with the seat monitoring.

In use, the system may operate to reconcile seat positions with a current phase of flight, and more specifically, monitor seat component positions to determine compliance according to a current phase of flight. For example, a take-off phase of flight may have predefined seat component positions for each of the seats in the layout and the system operates to ensure that the movable seat components are each in a compliant position for take-off. Seat components determined to be non-compliant may be moved to a compliant position, at the request of a user through the operation of the cabin controller. Seats may include individual passenger seats, divans, beds, and any other furniture configured for seating and including at least one adjustable seat component. Seat component movements may be actuator driven by instructions received from the local seat controller.

In embodiments, the ability to adjust the seat component positions from the central cabin controller may be used to move non-compliant seat components to a compliant position, reset all seat components to their default positions, reset all seats to individually customized seat positions corresponding to a phase of flight, and for other purposes. In embodiments, seat component positions may be controlled to ensure compliance for safety for a particular phase of flight, or according to customer preference for a particular phase of flight.

Passenger seat may be highly adjustable and include a plurality of actuator driven movable seat components including, but not limited to, a seat bottom, a backrest, a headrest, a leg rest, armrests, lumbar, and bolsters. Seats may also be adjustable in terms of their lateral, longitudinal, and rotational position. For instance, a seat may be adjustable between an upright sitting position for TTOL and a lie flat position during flight and/or may be configured to rotate to change the seat angle. A divan may be adjustable, for example, between passenger seats and a bed through lounge sitting positions.

In embodiments, each individual actuator may drive seat component adjustment by, for example, rotational and/or linear motion. Actuators may be independent or dependent, wherein an independent actuator operates as a primary driver and a dependent actuator operates considering the operation of its respective independent actuator(s). Actuators may move at different speeds, and may operate separately or in groups to achieve preset sitting positions. Actuators may also be controller independently. Each local seat controller may be configured with processing circuitry configured to execute independent seat components or coordinated seat motions by way of motion planning whereby actuators are coordinated to transition the seat between different predefined sitting positions. For example, one motion plan may transition the seat from upright to flat bed, whereas another motion plan may transition the seat from upright to cradle recline. In embodiments, motion plans may consider the available actuators and their performance capabilities in order to program a plan to transition the seat in a smooth, timely, ergonomic, and orchestrated manner.

Seat component movements may be further controlled in terms of sequence and speed, as different passengers may have different preferences as to how a seat transitions when occupied, and also the speed at which the seat transitions. For example, some passengers may feel more comfortable with a slow transition between extreme sitting positions, e.g., full upright to full flat bed, whereas other passengers may be comfortable with faster transitions. In some embodiments, a seat component may be moved at a slow rate of speed when the seat is determined to be occupied so as not to disturb or be perceptible to the seat occupant.

In some embodiments, each local seat controller may be communicatively coupled to at least one sensor and may utilize outputs from the sensors to adjust a motion plan and/or determine the occupancy state of the seat. For example, seat component motions may be adjustable to account for transient objects entering and exiting their travel path.

In embodiments, the current position of a movable seat component corresponds to a definite actuator position for the involved actuator(s). For example, a first definite position of an involved actuator (e.g., leg rest actuator) may correspond to a first position of the leg rest (e.g., stowed), whereas a second definite position of the same actuator may correspond to a different position of the leg rest (e.g., deployed), while intermediate definite positions of the involved actuator may correspond to the different way points along the motion path for achieving the transition from the first position to the second position. The present state of the movable seat component may be determined by the local seat controller from the current definite position of the involved actuator(s). The local seat controller operates to access the current definite actuator positions of the movable seat components, operate the actuators to move each actuator to a different actuator position along the motion path, and report the actuator positions to the cabin controller continuously or on an on-demand basis.

In embodiments, the seating environment is monitored by at least one sensor. The at least one sensor may be positioned in the seat itself to detect weight to determine the occupancy state, or in the immediate seat environment. In some embodiments, the at least one sensor may be positioned apart/separate from the seat, for instance overhead with respect to the seat such that the field of view of the at least one sensor includes at least the seat. In some embodiments, the at least one sensor may include a camera or other vision sensor configured to output images of the seat and its immediate environment. In use, the at least one sensor may be configured to monitor the physical seat components and the seat occupant. In some embodiments, the camera may capture frames to determine object and seat component movements.

In some embodiments, each of the local seat controllers and the cabin controller are configured to receive, determine, instruct, execute, etc. Each may include at least one processor, memory, and a communication interface, wherein the processor provides processing functionality for at least the respective controller and may include any number of processors, micro-controllers, circuitry, field programmable gate array (FPGA) or other processing systems, and resident or external memory for storing data, executable code, and other information accessed or generated by respective controller. The processor may execute one or more software programs embodied in a non-transitory computer readable medium (e.g., memory) that implements techniques described herein. The processor is not limited by the materials from which it is formed, or the processing mechanisms employed therein and, as such, can be implemented via semiconductor(s) and/or transistors (e.g., using electronic integrated circuit (IC) components), and so forth.

The memory may be an example of tangible, computer-readable storage medium that provides storage functionality to store various data and/or program code associated with operation of the processor, such as software programs and/or code segments, or other data to instruct the processor, and possibly other components of the controller, to perform the functionality described herein. Thus, the memory can store data, such as a program of instructions for operating the respective controller, including its components (e.g., processor, communication interface, etc.), and so forth. It should be noted that while a single memory is described, a wide variety of types and combinations of memory (e.g., tangible, non-transitory memory) may be employed. The memory may be integral with the processor, may comprise stand-alone memory, or may be a combination of both. Some examples of the memory may include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface may be operatively configured to communicate with components of the respective controller. For example, the communication interface may be configured to retrieve data from the processor or other devices, transmit data for storage in the memory, retrieve data from storage in the memory, and so forth. The communication interface may also be communicatively coupled with the processor to facilitate data transfer between components of the respective controller and the processor. It should be noted that while the communication interface is described as a component of the respective controller, one or more components of the communication interface may be implemented as external components communicatively coupled to the respective controller via a wired and/or wireless connection. The respective controller may also include and/or connect to one or more input/output (I/O) devices (e.g., human machine interface (HMI) devices) via the communication interface. In embodiments, the communication interface may include a transmitter, receiver, transceiver, physical connection interface, or any combination thereof.

FIG. 1 is a block diagram illustrating a system 100 for monitoring seating in an aircraft, for instance a layout of different types of seats (e.g., individual passenger seats and divans) in a cabin of a business or private jet. In embodiments, the system 100 includes a plurality of local seat controllers 102*a*, 102*b*, 102*c* . . . 102*n*, wherein each local seal controller is associated with a seat 104*a*, 104*b*, 104*c* . . . 104*n* and is communicatively coupled to at least one actuator 106 mechanically coupled to at least one movable seat component 108. As discussed above, movable seat components can include, but are not limited to, a seat bottom, backrest, leg rest, armrests, frame members, swivel mechanism, etc. In embodiments, different seals may have different configurations and adjustabilities and therefore may be equipped with different movable seat components. For example, an individual passenger seat may be highly adjustable whereas a divan may adjust between seats and a bed.

The system 100 further includes a cabin controller 110 communicatively coupled to each of the plurality of local seat controllers 102*a*, 102*b*, 102*c* . . . 102*n*. The cabin controller 110 may be positioned remote from the seats, for instance in a crew area of the cabin separated from the seats. In embodiments, the cabin controller 110 includes an interactive digital display 112, a memory 114, and a processor 116 including processing circuitry configured to execute machine-readable instructions stored to a non-transitory computer readable medium as discussed above.

FIG. 2 illustrates a look-up table 118 stored in the memory of the cabin controller 110, or elsewhere, which includes information pertaining to allowable seal component positions corresponding to phases of flight. In embodiments, a current phase of flight may be received from an aircraft system such as a phase of flight selector. Phases of flight may include, but are not limited to, pre-flight, taxi, take-off, climb, cruise, descent, landing, and post-flight. Certain ones of the phases may be customizable, for instance those that are not safety critical for the passengers such as pre-flight and post-flight, and in some instances cruise. Each predefined phase of flight may have predefined positions for each of the movable seal components, for instance stowed seal components and upright and forward facing sitting positions for TTOL may be indicated by a first position number, whereas other seat positions may be indicated by a second position, and passenger preferred seat positions may be indicated by yet a different position number.

With continued reference to FIG. 1, the processor 116 of the cabin controller 110 is configured to receive, from each of the plurality of local seat controllers 102*a*, 102*b*, 102*c* . . . 102*n*, positional information from the at least one actuator 106 determinative of positional information of the at least one movable seat component 108, and receive, from a flight phase selector 120, a current phase of flight. The processor 116 is further configured to determine for each seat 104*a*, 104*b*, 104*c* . . . 104*n*, from the received positional information from the at least one actuator 106 and the received current phase of flight, movable seat position compliance or non-compliance. The processor 116 is further configured to cause the interactive digital display 112 to display for each seat the determined movable seat component compliance or non-compliance. For each seat having a movable seat component 108 determined to be non-compliant, the processor 116 is further configured to instruct, through the interactive digital display 112, the respective local seal controller to operate the at least one actuator to move the at least one movable seat component to achieve a compliant seat component position.

In some embodiments, each seat includes at least one sensor 122, positioned in the seat or environment, configured to sense an occupancy state of the respective seat. In such embodiments, the local seat controller 102*a*, 102*b*, 102*c* . . . 102*n* is communicatively coupled to the at least one sensor 122 and is configured to determine the occupancy state of the seat and report the determined occupancy state to the cabin controller 110. In embodiments, the processing circuitry of the cabin controller 110 is further configured to allow the local seat controller 102*a*, 102*b*, 102*c* . . . 102*n* to operate the at least one actuator 106 to move the at least one movable seat component 108 to achieve a compliant seat component position when the occupancy state of the respective seal is determined to be unoccupied.

Figure 3:
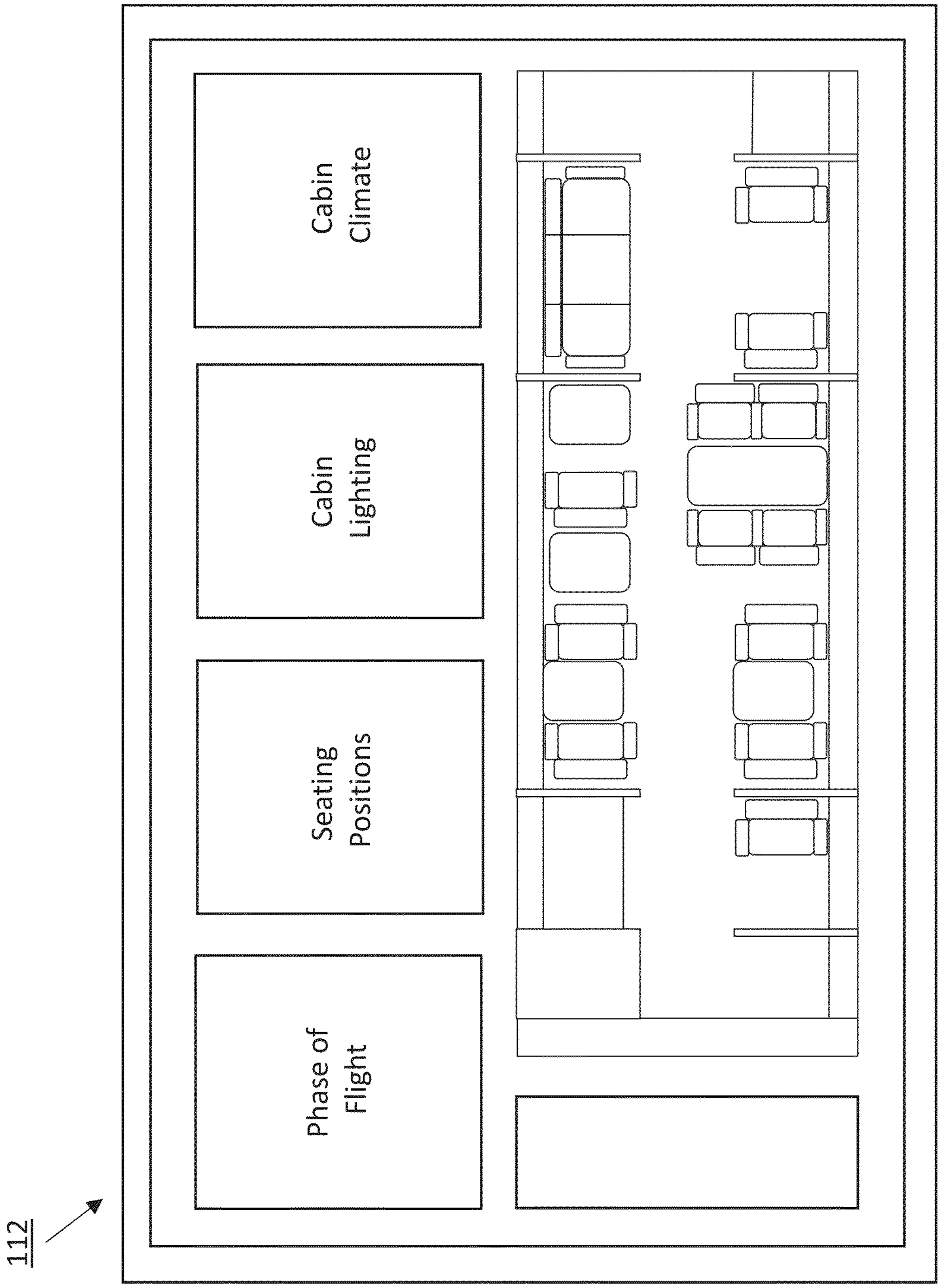
FIG. 3 is an illustration of a layout of seats in a monitored cabin and associated information; in accordance with example embodiments of this disclosure.

FIG. 3 illustrates the graphical display of the interactive digital display 112. In embodiments, the interactive digital display 112 is configured to display a layout of the seats in the aircraft having adjustment capability, display the at least one movable seat component for each seat, and differentiate graphically between compliant and non-compliant movable seat component positions. In embodiments, differentiation may be indicated by showing real-time positions of the seat components, graphics, color-coding, etc., to draw attention to the non-compliant seat components thereby alerting the flight crew to their non-compliant state. In embodiments, the processing circuitry of the cabin controller may be further configured to issue an alert, broadcast by the interactive digital display, audible alert, etc., when the at least one movable seat component is determined to be non-compliant. In addition to the current seat layout, the interactive digital display 112 may show other information and cabin controls such as phase of flight, possible sealing positions corresponding to the phase of flight, cabin lighting, cabin climatization, among others. The interactive digital display 112 may include navigable menus and include touch screen functionality.

In embodiments, the processing circuitry of the cabin controller 110 is further configured to instruct all of the plurality of local seat controllers 102*a*, 102*b*, 102*c* . . . 102*n* to operate their respective at least one actuator 106 to move their respective at least one movable seat component 108 to a predefined default position assigned to a predefined phase of flight. For example, to ready the passenger cabin during pre-flight, the cabin controller 110 may be used by the flight crew to input a command to instruct the local seat controllers 102*a*, 102*b*, 102*c* . . . 102*n* to operate their respective actuators to move their respective seat components to an appropriate position for taxi and take-off. In another example, the cabin controller 110 may be configured to instruct all of the plurality of local seat controllers 102*a*, 102*b*, 102*c* . . . 102*n* to operate their respective at least one actuator 106 to move their respective at least one movable seat component 108 to a predefined position based on customer preference and historical data. For example, while in pre-flight or post-flight, the cabin controller 110 may be used by the flight crew to input a command to instruct the local seat controllers 102*a*, 102*b*, 102*c* . . . 102*n* to operate their respective actuators to set up the cabin seating, or portions thereof, for conferencing, entertaining, dining, sleeping, etc. Thus, referring again to FIG. 2, the table may include phases of flight where the seats component positions are entirely customizable.

Figure 4:
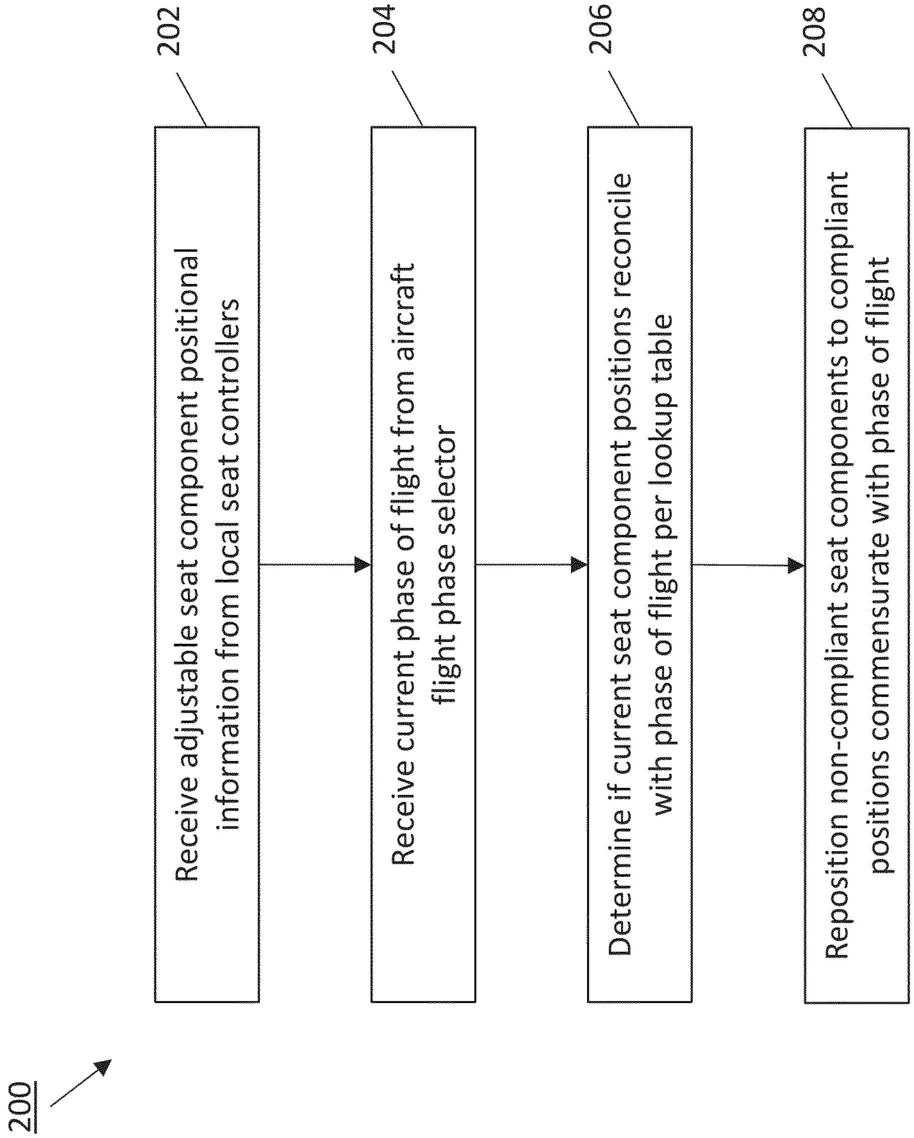
FIG. 4 is a flow diagram illustrating processor implementation steps for monitoring the seating in an aircraft, in accordance with example embodiments of this disclosure.

FIG. 4 is a flow diagram 200 illustrating processor implementation steps for monitoring the movable seat component positions in an aircraft passenger cabin including a plurality of local seat controllers each associated with a seat and communicatively coupled to at least one actuator mechanically coupled to at least one movable seat component. In step 202, the method includes receiving, from each of the plurality of local seat controllers, positional information from the at least one actuator determinative of positional information of the at least one movable seat component. In a step 204, the method includes receiving, from a flight phase selector, a current phase of flight. In a step 206, the method includes determining for each seat, from the received positional information from the at least one actuator and the received current phase of flight, movable seat position compliance or non-compliance. In a step 208, for each seat having a movable seat component determined to be non-compliant, the method includes instructing the respective local seat controller to operate the at least one actuator to move the at least one movable seat component to achieve a compliant seat component position. In embodiments, the method is performed by the cabin controller communicatively coupled to the plurality of local seat controllers as described above.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for monitoring seating in an aircraft, comprising:

a plurality of local seat controllers, each local seat controller associated with a seat and communicatively coupled to at least one actuator mechanically coupled to at least one movable seat component of the seat, each seat including at least one sensor configured to sense an occupancy state of the seat, wherein the local seat controller is communicatively coupled to the at least one sensor and is configured to determine the occupancy state of the seat based on the at least one sensor; and a cabin controller communicatively coupled to the plurality of local seat controllers, the cabin controller including an interactive digital display, a memory, and a processor, wherein:

a table is stored in the memory of the cabin controller and includes information pertaining to compliant seat component positions corresponding to phases of flight; and the processor includes processing circuitry configured to execute machine-readable instructions stored to a non-transitory computer readable medium, wherein the instructions, when executed by the processing circuitry, cause the processing circuitry to:

receive, from each of the plurality of local seat controllers, positional information from the at least one actuator determinative of positional information of the at least one movable seat component;

receive, from each of the plurality of local seat controllers, the determined occupancy state of the respective seat;

receive, from a flight phase selector, a current phase of flight;

determine for each seat, from the received positional information from the at least one actuator and the received current phase of flight, movable seat position compliance or non-compliance;

cause the interactive digital display to display for each seat the determined movable seat component compliance or non-compliance; and for each seat having the movable seat component determined to be non-compliant, instruct, through the interactive digital display, the respective local seat controller to operate the at least one actuator to move the at least one movable seat component to achieve a compliant seat component position only when the determined occupancy state of the seat indicates that the seat is unoccupied.

2. The system according to claim 1, wherein the interactive digital display is configured to:

display a layout of the seats in the aircraft;

display the at least one movable seat component for each seat; and differentiate graphically between compliant and non-compliant movable seat component positions.

3. The system according to claim 1, wherein the phases of flight include at least two of pre-flight, taxi, take-off, climb, cruise, descent, approach, landing, taxi, and post-flight.

4. The system according to claim 1, wherein the at least one movable seat component includes at least one of a backrest and a leg rest.

5. The system according to claim 1, wherein each seat is an individual passenger seat or a divan.

6. The system according to claim 1, wherein the processing circuitry of the cabin controller is further configured to issue an alert, broadcast by the interactive digital display, when the at least one movable seat component is determined to be non-compliant.

7. The system according to claim 1, wherein the processing circuitry of the cabin controller is further configured to instruct all of the plurality of local seat controllers to operate their respective at least one actuator to move their respective at least one movable seat component to a predefined default position assigned to a predefined phase of the phases of flight.

8. The system according to claim 7, wherein the predefined default position for each seat is customizable.

9. The system according to claim 1, wherein at least one of the seats is an individual passenger seat and at least one of the seats is a divan.

10. A system for monitoring seating in an aircraft passenger cabin including a plurality of local seat controllers each associated with a seat and communicatively coupled to at least one actuator mechanically coupled to at least one movable seat component, the system comprising:

a cabin controller positioned in the aircraft remote from the plurality of local seat controllers, the cabin controller communicatively coupled to the plurality of local seat controllers, and the cabin controller including an interactive digital display, a memory, and a processor, wherein:

a table is stored in the memory of the cabin controller and includes information pertaining to compliant seat component positions corresponding to phases of flight; and the processor includes processing circuitry configured to execute machine-readable instructions stored to a non-transitory computer readable medium, wherein the instructions, when executed by the processing circuitry, cause the processing circuitry to:

receive, from each of the plurality of local seat controllers, positional information from the at least one actuator determinative of positional information of the at least one movable seat component;

receive, from each of the plurality of local seat controllers, occupancy information indicative of an occupancy state of the seat associated with the respective local seat controller, wherein each local seat controller is communicatively coupled to at least one occupancy sensor associated with its respective seat;

receive, from a flight phase selector, a current phase of flight;

determine for each seat, from the received positional information from the at least one actuator and the received current phase of flight, movable seat position compliance or non-compliance;

cause the interactive digital display to display for each seat the determined movable seat component compliance or non-compliance; and for each seat having the movable seat component determined to be non-compliant, instruct, through the interactive digital display, the respective local seat controller to operate the at least one actuator to move the at least one movable seat component to achieve a compliant seat component position only when the occupancy state of the seat is determined to be unoccupied.

11. The system according to claim 10, wherein the interactive digital display is configured to:

display a layout of the seats in the aircraft;

display the at least one movable seat component for each seat; and differentiate graphically between compliant and non-compliant movable seat component positions.

12. The system according to claim 10, wherein the phases of flight include at least two of pre-flight, taxi, take-off, climb, cruise, descent, approach, landing, taxi, and post-flight.

13. The system according to claim 10, wherein the at least one movable seat component includes at least one of a backrest and a leg rest.

14. The system according to claim 10, wherein the processing circuitry of the cabin controller is further configured to instruct all of the plurality of local seat controllers to operate their respective at least one actuator to move their respective at least one movable seat component to a predefined default position assigned to a predefined phase of the phases of flight.

15. A method for monitoring movable seat component positions in an aircraft passenger cabin including a plurality of local seat controllers each associated with a seat and communicatively coupled to at least one actuator mechanically coupled to at least one movable seat component, the method comprising the steps of:

receiving, from each of the plurality of local seat controllers, positional information from the at least one actuator determinative of positional information of the at least one movable seat component;

receiving, from each of the plurality of local seat controllers, occupancy information indicative of an occupancy state of the seat associated with the respective local seat controller, wherein each local seat controller is communicatively coupled to at least one occupancy sensor associated with its respective seat;

receiving, from a flight phase selector, a current phase of flight;

determining for each seat, from the received positional information from the at least one actuator and the received current phase of flight, movable seat position compliance or non-compliance; and for each seat having the movable seat component determined to be non-compliant, instructing the respective local seat controller to operate the at least one actuator to move the at least one movable seat component to achieve a compliant seat component position only when the occupancy state of the seat is determined to be unoccupied;

wherein the method is performed by a cabin controller communicatively coupled to the plurality of local seat controllers, the cabin controller including an interactive digital display, a memory, and a processor, wherein a table is stored in the memory of the cabin controller and includes information pertaining to compliant seat component positions corresponding to phases of flight, and the processor includes processing circuitry configured to execute machine-readable instructions stored to a non-transitory computer readable medium.

* * * * *